US008469095B2

(12) United States Patent
Le Roy-Delage et al.

(10) Patent No.: US 8,469,095 B2
(45) Date of Patent: Jun. 25, 2013

(54) SELF ADAPTIVE CEMENT SYSTEMS

(75) Inventors: Sylvaine Le Roy-Delage, Paris (FR); Muriel Martin-Beurel, Rijswijk (NL); Keith Dismuke, Katy, TX (US); Erik Nelson, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 115 days.

(21) Appl. No.: 12/892,543

(22) Filed: Sep. 28, 2010

(65) Prior Publication Data

US 2011/0067868 A1 Mar. 24, 2011

Related U.S. Application Data

(63) Continuation-in-part of application No. 10/557,106, filed as application No. PCT/EP2004/005479 on May 12, 2004, now abandoned.

(60) Provisional application No. 60/470,341, filed on May 14, 2003.

(51) Int. Cl.
*E21B 33/14* (2006.01)

(52) U.S. Cl.
USPC ........................................................ 166/293

(58) Field of Classification Search
USPC ........................................................ 166/293
See application file for complete search history.

(56) References Cited

U.S. PATENT DOCUMENTS

| 2,670,048 | A | * | 2/1954 | Menaul | 166/295 |
| 3,730,276 | A | * | 5/1973 | Land | 166/371 |
| 4,664,816 | A | | 5/1987 | Walker | |
| 5,393,343 | A | * | 2/1995 | Darwin et al. | 106/808 |
| 5,443,636 | A | * | 8/1995 | Montgomery | 106/805 |
| 5,575,841 | A | | 11/1996 | Dry | |
| 5,587,012 | A | * | 12/1996 | Montgomery | 106/823 |
| 5,660,624 | A | | 8/1997 | Dry | |
| 5,665,158 | A | * | 9/1997 | Darwin et al. | 106/808 |
| 5,683,503 | A | * | 11/1997 | Montgomery | 106/823 |
| 5,989,334 | A | | 11/1999 | Dry | |
| 5,997,633 | A | * | 12/1999 | Montgomery | 106/804 |
| 6,261,360 | B1 | | 7/2001 | Dry | |
| 6,296,057 | B2 | | 10/2001 | Thiercelin | |
| 6,458,198 | B1 | | 10/2002 | Baret et al. | |
| 6,527,849 | B2 | | 3/2003 | Dry | |
| 6,843,841 | B2 | * | 1/2005 | Reddy et al. | 106/162.2 |
| 2003/0181543 | A1 | | 9/2003 | Reddy et al. | |
| 2004/0168802 | A1 | * | 9/2004 | Creel et al. | 166/293 |
| 2004/0221990 | A1 | * | 11/2004 | Heathman et al. | 166/292 |
| 2005/0222302 | A1 | * | 10/2005 | Pageau | 524/13 |
| 2007/0137528 | A1 | * | 6/2007 | Le Roy-Delage et al. | 106/718 |

FOREIGN PATENT DOCUMENTS

| EP | 0530768 | 2/1996 |
| EP | 1129047 | 11/2002 |
| GB | 2271350 | 4/1994 |
| WO | 00/37387 | 6/2000 |
| WO | 01/70646 | 9/2001 |
| WO | 01/74967 | 10/2001 |
| WO | 03/068708 | 8/2003 |

OTHER PUBLICATIONS

Database WPI Section Ch, Week 200204 Derwent Publications Ltd, London, GB Class A93, AN 2002-028940 XP002295616 & JP 2001 146457 A (Denki Kagaku Kogyo KK) May 29, 2001 abstract.
Database WPI Section Ch, Week 199209 Derwent Publications Ltd, London, GB Class A93, AN 1992-072444 XP002296443 & ZA 9 100 876 A (Snashall H T) Dec. 24, 1991 abstract.
C.M. Dry, "Three designs for the internal release of sealants, adhesives, and waterproofing chemicals into concrete to reduce permeability", Cement and Concrete Research 30 (2000) pp. 1969-1977.

* cited by examiner

*Primary Examiner* — Paul Marcantoni
(74) *Attorney, Agent, or Firm* — Michael Dae

(57) ABSTRACT

A self-healing cement system includes cement, water and at least one additive that swells in contact with water from reservoir or from formation in the case of a structural failure in the set cement to provide a physical barrier in the zone of failure. Examples of such material include particles of super-absorbent polymer. These additives have the effect of making the cement self-healing in the event of physical failure or damage such as micro-annuli. The self healing property is produced by the contact of the water itself, the potential repair mechanism is thus activated if and when needed in case of start of loss of zonal isolation. Several super-absorbent polymers have been identified such as polyacrylamide, modified crosslinked poly(meth)acrylate and non-soluble acrylic polymers.

14 Claims, No Drawings

SELF ADAPTIVE CEMENT SYSTEMS

CROSS-REFERENCED APPLICATIONS

This application is a Continuation In Part application of U.S. patent application Ser. No. 10/557,106 filed in the United States Patent and Trademark Office on Dec. 11, 2006 now abandoned from international application PCT/EP2004/005479 which was filed on May 12, 2004 claiming the benefit of the disclosure of U.S. provisional patent application Ser. No. 60/470,341 filed on May 14, 2003.

TECHNICAL FIELD

Embodiments relate to adaptive cement systems. In particular, cement systems which are "self-healing", i.e. system which can adapt to compensate for changes or faults in the physical structure of the cement, or which adapt their structure after the setting phase of the cement in the cementing of oil, gas, water or geothermal wells, or the like.

BACKGROUND

The statements in this section merely provide background information related to the present disclosure and may not constitute prior art. During the construction of underground wells, it is common, during and after drilling, to place a liner or casing, secured by cement pumped into the annulus around the outside of the liner. The cement serves to support the liner and to provide isolation of the various fluid-producing zones through which the well passes. This later function is important since it prevents fluids from different layers contaminating each other. For example, the cement prevents formation fluids from entering the water table and polluting drinking water, or prevents water from passing into the well instead of oil or gas. In order to fulfill this function, it is necessary that the cement be present as an impermeable continuous sheath. However, for various reasons, over time this sheath can deteriorate and become permeable. The deterioration can be due to physical stresses caused by tectonic movements of temperature effects, chemical degradation of the cement, or various other reasons.

There have been a number of proposals to deal with the problems of deterioration of the cement sheath over time. One approach is to design the cement sheath to take into account physical stresses that might be encountered during its lifetime. Such an approach is described in U.S. Pat. No. 6,296,057. Another approach is to include in the cement composition materials that improve the physical properties of the set cement. U.S. Pat. No. 6,458,198 describes the addition of amorphous metal fibers to the cement slurry to improve its strength and resistance to impact damage. EP 1129047 and WO 00/37387 describe the addition of flexible materials (rubber or polymers) to the cement to confer a degree of flexibility on the cement sheath. WO 01/70646 and PCT/EP03/01578 describe cement compositions that are formulated so as to be less sensitive to the effects of temperature on the cement when setting. These references are incorporated herein by reference thereto.

A number of proposals have been made for designs of self-healing concretes for use in the construction industry. These are described in U.S. Pat. No. 5,575,841, U.S. Pat. No. 5,660,624, U.S. Pat. No. 5,989,334, U.S. Pat. No. 6,261,360 and U.S. Pat. No. 6,527,849, and in "Three designs for the internal release of sealants, adhesives, and waterproofing chemicals into concrete to reduce permeability", Dry, C. M., Cement and Concrete Research 30 (2000) 1969-1977. None of these are immediately applicable to well cementing operations because of the need for the cement to be pumpable during placement and because of the pressure and temperature range. These references are incorporated herein by reference thereto.

It is an objective to provide well cementing systems that can be placed by pumping in the normal manner, and which contain materials that allow the cement sheath to adapt its structure in response to environmental conditions.

SUMMARY

More precisely, embodiments focus upon providing well cementing systems that include at least one additive that reacts and/or swells when the set cement is in contact with an aqueous fluid, such as formation waters. This behavior has the effect of making the cement self-healing in the event of physical failure or damage.

Self-healing in the context of the present disclosure is to be understood as the capacity of the cement matrix to repair itself when a crack, void or default appears after setting. Within the present context, self-healing or self-repairing will be used indifferently.

Those skilled in the art will recognize that a pumpable cement slurry has a viscosity preferably below about 1000 mPa-s at a shear rate of $100\ s^{-1}$, throughout the temperature range the slurry will experience during placement in the well.

The additive is a material which reacts/expands in contact with water—for instance from the underground formation which enters a fault in the cement matrix. Examples of such materials include super-absorbent polymers. Super-absorbent polymers are crosslinked networks of flexible polymer chains. The most efficient water absorbers are polymer networks that carry dissociated, ionic functional groups. When super-absorbent polymers absorb liquids, an elastic gel forms. The gel is a soft, deformable solid composed of water and the expanded polymer chains.

The polymer particles can be of almost any shape and size: spherical, fiber-like, ovoid, mesh systems, ribbons, etc., which allows their easy incorporation in cement slurries of comprising solid materials in discrete particle size bands. In practice, polymer particles ranging from about 10 to about 1500µ can be used.

The absorbent materials may be dry blended with the cement and any other solid components before transport to the well-site, mixing with water and placement in the well. The sizes and quantities will be selected to allow even dispersion through the cement matrix.

It has been found that though the super-absorbent polymers such as polyacrylamide and modified crosslinked polymethacrylate swell when incorporated in a cement slurry, they seem to release at least part of the absorbed water during the cement hydration and hence, have a reserve of absorbability that allow them to swell again if they are later exposed to water due to a crack of the matrix for instance. Since they are highly reactive with water, the concentration of super-absorbent added to the blend must remain relatively small, compositions with more than 3.2% of super-absorbent (by weight of cement) may typically have a viscosity too high for pumping the slurry in favorable conditions. In fact the maximum SAP concentration depends on the slurry density and also on the nature of the Super Absorbent Polymer.

It has been found that the addition of salts such as sodium chloride or calcium chloride for instance favors the rheology of the systems thereby enabling increasing the concentration of super-absorbent polymers. Cement slurries of lower density have also a greater acceptability of higher concentrations of super-absorbent polymers, even without salt.

In a further aspect, at least part of the super-absorbent polymers are encapsulated so that they are—for instance in the form of a resin or other material that releases the polymer in response to exposure to a downhole parameter (for instance such as temperature, a specific mineral system, pressure, shear etc). In yet another aspect, the rupture of the encapsulating means is actually induced by the failure of the cement matrix, in a way similar to the mechanism described by Dry for instance in U.S. Pat. No. 5,575,841, U.S. Pat. No. 5,660,624, U.S. Pat. No. 5,989,334, U.S. Pat. No. 6,261,360 and U.S. Pat. No. 6,527,849. These references are incorporated herein by reference thereto.

DETAILED DESCRIPTION

A screening has been carried out for identifying super-absorbent polymers suitable for self-healing cementing applications. The main issues were to check the ability to dry blend the polymers with cement and to optimize the rheology and thickening time.

Testing Procedure

Tests have been carrying out by incorporating powders of various types of polymers as solid additives in cement slurries. Properties of the slurry as well as properties of the set cement have been studied.

The slurries were optimized with the mere objective of obtaining stability. Focus was to get acceptable plastic viscosity (PV) and yield stress (TY) at mixing time and after 20 minutes of conditioning. Free water and sedimentation tests were also carried out. Mixing and test procedure was according to API Spec 10.

The same equipment and bob was used for all rheology measurements, whatever the tested design. Many tests were performed at one slurry density (15.8 lbm/gal) and one temperature (BHCT equal to 60° C.). Some examples were studied at 12 lbm/gal and at 14 lbm/gal. For lowest density, the temperature is equal 25° C. and 85° C. The design is based on tap water and black Dyckerhoff North cement. Unless otherwise mentioned, all designs include an antifoam agent based on polypropylene glycol at 0.03 gallon per US gallons per sack of 94 lbs of cement (in other words, 1 gps=88.78 cc/kg), polynapthalene sulfonate as dispersing agent at 0.04 gps and the superabsorbent polymer at concentration ranging from 0.1% BWOC (by weight of cement) to 0.9% BWOC. for 15.8 lbm/gal. Decreasing the density allows to increase the concentration in Super Absorbent Polymer. For instance for a given SAP the maximum concentration at 15.8 lbm/gal is 1% bwoc without salt in the mixing water and can reach 3% bwoc at 12 lbm/gal.

Three types of superabsorbent polymers were tested: S1, a polyacrylamide available form Lamberti, Italy. Three grades were tested, namely S1G-Lamseal® G, with particles ranging form 500µ to 1500µ (density 1.25 g/cm$^3$), S1GS—Lamseal® GS, with particles of about 200µ (density 1.48 g/cm$^3$), and S1GM, Lamseal® GM, with particles of about 700µ (density 1.47 g/cm$^3$). S2, a modified polyacrylate available from Itochu, Japan, under the name Aqualic® CS-6HM, selected for its salt resistance, in particular its capacity to keep super absorbent capacity in high valent metal ions solutions. The average particle size is 100µ and the density 1.46 g/cm$^3$. S3, a non soluble acrylic polymers, Norsocryl C200 from Atofina with particles of about 250µ in average (density 1.6 g/cm$^3$).

In the examples, bwoc or BWOC stands for by weight of cement and bwow or BWOW for by weight of water.

EXPERIMENTAL RESULTS

Example 1

Addition Procedure

The first step was to define the best addition process. As shown in table 1 below, dry blending induces lower effects on rheology and free water and leads to an easy mixing

TABLE 1

| Design | Reference | A1 | A2 | A3 |
|---|---|---|---|---|
| S1G (% bwoc) | | 0.1 | 0.1 | 0.1 |
| Note | | prehydrated (static) | dry blended | prehydrated under agitation at 2000 RPM during 15 minutes. |
| Mixing rheology | | | | |
| Ty (lbf/100 ft$^2$) | 2.3 | 2.8 | 1.4 | 3.2 |
| PV (cP) | 25.5 | 18.9 | 27.2 | 32.4 |
| BHCT rheology at 60° C. | | | | |
| Ty (lbf/100 ft$^2$) | 24.6 | 21.2 | 27.3 | 52.8 |
| PV (cP) | 20.9 | 18.4 | 26.6 | 33.3 |
| 10'/1'gel | 25/16 | 14/9 | 19/11 | 15/13 |
| Free Water mL | 1 | 7 | trace | 2.5 |
| Sedimentation ppg | 1.14 | 1 | 0.4 | 0.7 |

Example 2

Influence of the Particle Sizes

For the S1 particles, the finer the particles, the higher the rheology and free water.

TABLE 2

| Design | Reference | S1 G | S1 GM | S1GS |
|---|---|---|---|---|
| S1 (% bwoc) |  | 0.1 | 0.1 | 0.1 |
| Mixing rheology | | | | |
| Ty (lbf/100 ft$^2$) | 2.3 | 1.4 | 2.7 | 6.7 |
| PV (cP) | 25.5 | 27.2 | 29 | 41 |
| BHCT rheology at 60° C. | | | | |
| Ty (lbf/100 ft$^2$) | 24.6 | 27.3 | 24.4 | 38.7 |
| PV (cP) | 20.9 | 26.6 | 35.6 | 40.9 |
| 10'/1'gel | 25/16 | 19/11 | 15/12 | 12/9 |
| Free Water mL | 1 | trace | 2 | 4 |
| Sedimentation ppg | 1.14 | 0.4 | 1 | 0.9 |

Example 3

This test shows that cement slurry with super-absorbent polymers S1 are compatible with conventional fluid loss control additive (flac). This shows that the composition of some embodiments may still be optimized by the addition of conventional additives such as dispersing agent, fluid loss control agent, set retarder, set accelerator and anti-foaming agent.

TABLE 3

| Design | X3.1 | X3.2 |
|---|---|---|
| S1G (% bwoc) | 0.1 | 0.1 |
| Flac |  | 0.4 |
| Mixing rheology | | |
| Ty (lbf/100 ft$^2$) | 1.4 | 7.9 |
| PV (cP) | 27.2 | 104.7 |
| BHCT rheology at 60° C. | | |
| Ty (lbf/100 ft$^2$) | 27.3 | 13.7 |
| PV (cP) | 26.6 | 125 |
| 10'/1'gel | 19/11 | 13/7 |
| Free Water mL | trace | trace |

Example 4

Results with the polymethacrylate based superabsorbent polymer S2 show less sensitivity to the addition mode.

TABLE 4.1

| Design | Reference | X4.1 | X4.2 | X4.3 | X4.4 |
|---|---|---|---|---|---|
| S2 (% bwoc) | — | 0.05 dry blended | 0.1 dry blended | 0.1 prehydrated | 0.15 dry blended |
| Mixing rheology | | | | | |
| Ty (lbf/100 ft$^2$) | 2.3 | 4.8 | 5.6 | 6.4 | 5.3 |
| PV (cP) | 25.5 | 31.9 | 35.9 | 37.9 | 64.8 |
| BHCT rheology at 60° C. | | | | | |
| Ty (lbf/100 ft$^2$) | 24.6 | 20.2 | 23.3 | 20.7 | 19.9 |
| PV (cP) | 20.9 | 24.3 | 22.4 | 30.3 | 57 |
| 10'/1'gel | 25/16 | 17/9 | 15/9 | 12/7 | 12/10 |
| Free Water mL | 1 |  | 2.8 | 4.5 | 5.5 |
| Sedimentation ppg | 1.14 | 0.6 | 0.6 | 0.9 | 1 |

Polymer S2 can also be added in higher quantity, at least up to 0.45% BWOC as shown in the following table 4.2:

TABLE 4.2

| Design | Reference | 1 | 2 | 3 | 4 |
|---|---|---|---|---|---|
| antifoam (gps) | 0.03 | 0.03 | 0.03 | 0.03 | 0.03 |
| Dispersing agent (gps) | 0.04 | 0.04 | 0.04 | 0.04 | 0.04 |
| S2 (% bwoc) | 0 | 0.9 (exces) | 0.2 | 0.45 | 0.45 |
| S2 (% bwow) | 0 | 2 | 0.44 | 1 | 1 |
| Remarque |  | dry blended | dry blended | dry blended | prehydrated |
| Mixing rheology | | | | | |
| Ty (lbf/100 ft$^2$) | 2.3 | Too | 8.3 | 19.7 | 24.9 |
| PV (cP) | 25.5 | viscous | 52.2 | 142.8 | 228.7 |
| Comment |  |  |  |  | Difficult mixing |
| BHCT rheology at 60° C. | | | | | |
| Ty (lbf/100 ft$^2$) | 24.6 | Too viscous | 14.3 | 25.8 | 11.6 |
| PV (cP) | 20.9 |  | 40.3 | 172.5 | 178.4 |
| 10'/1'gel | 25/16 |  | 14/9 | 25/7 | 18/9 |
| Free water mL | 1 | 0 | 7 | 6 | 4.5 |
| Sedim ppg | 1.14 | 0.1 | 1.2 | 0.2 | 0.2 |

Example 5

This example shows that the setting properties and the rheological properties can be optimized, a key requirement for well cementing applications. In all cases, the super-absorbent polymer was dry blended with the cement.

TABLE 5.1

| Design | | 8 | 9 | 10 |
|---|---|---|---|---|
| S2 (% bwoc) | | 0.1 | 0.1 | 0.1 |
| Antifoam (gps) | | 0.03 | 0.03 | 0.03 |
| Lignosulfonate (gps) | | 0.05 | — | 0.025 |
| Fluid loss control agent (gps) | | 0.4 | 0.4 | 0.4 |
| Polynaphtalene (gps) | | 0.045 | 0.045 | 0.045 |
| Mixing rheology | Ty (lbf/100 ft²) | 10.4 | 11 | 10.6 |
| | PV (cP) | 121.9 | 134 | 125.8 |
| BHCT rheology at 60° C. | Ty (lbf/100 ft²) | 15.5 | 16.7 | 16 |
| | PV (cP) | 132 | 132.4 | 129 |
| | 10'/1'gel | 24/10 | 9/5 | 12/7 |
| | Free water mL | 0 | 0 | 0 |
| | Sedimentation ppg | 0.2 | 0.2 | 0.4 |
| | Thickening test 100 Bc (hh:min) | 13 h 30 min | 3 h 03 min | 8 h 49 min |

TABLE 5.2

| Design | 29 | 30 | 31 | 32 |
|---|---|---|---|---|
| Antifoam (gps) | 0.03 | 0.03 | 0.03 | 0.03 |
| Lignosulfonate (gps) | 0.025 | 0.025 | 0.025 | 0.025 |
| Fluid loss control agent (gps) | 0.4 | 0.4 | — | 0.2 |
| Polynaphtalene (gps) | 0.045 | 0.6 | 0.045 | 0.045 |
| Mixing rheology | | | | |
| Ty (lbf/100 ft²) | 46.8 | 41.9 | 23 | 32 |
| PV (cP) | 303 | 293 | 92 | 154 |
| BHCT rheology at 60° C. | | | | |
| Ty (lbf/100 ft²) | 32 | 35 | 6.6 | 19 |
| PV (cP) | 226 | 248 | 66 | 145 |
| 10'1'gel | 12/7 | 11/6 | 11/7 | 9/4 |
| Free water mL | Trace | Trace | 10 | 2.5 |

In the table 5.2, the designed slurries have a density of 15.8 lbm/gal, and the concentration of super-absorbent S2 is 0.3% bwoc (corresponding to 0.7% bwow).

TABLE 5.3

| Design | 33 | 34 | 35 |
|---|---|---|---|
| Antifoam (gps) | 0.03 | 0.03 | 0.03 |
| Lignosulfonate (gps) | 0.025 | 0.025 | — |
| NaCl (by weight of water) | | | 37 |
| Fluid loss control agent (gps) | 0.2 | 0.15 | — |
| Polynaphtalene (gps) | 0.045 | 0.045 | 0.9 |
| Mixing rheology | | | |
| Ty (lbf/100 ft²) | 46.8 | 45 | 4.4 |
| PV (cP) | 223 | 208 | 61 |
| BHCT rheology at 60° C. | | | |
| Ty (lbf/100 ft²) | 27 | 50 | 14 |
| PV(cP) | 217 | 240 | 51 |
| 10'/1'gel | 10/5 | 10/7 | 20/9 |
| Free water mL | 1.5 | 1 | — |
| API Fluid loss (ml) | | 170 | |

In the table 5.3, the designed slurries have a density of 15.8 lbm/gal, and the concentration of super-absorbent S2 is 0.4% bwoc (corresponding to 0.9% bwow).

Example 6

This example shows that the addition of a salt allows an increase of the concentration of superabsorbent polymer while keeping acceptable rheology properties. In table 6.1, tests have been carried out with sodium chloride as added salt. In table 6.2, the added salt is calcium chloride. In both tables, the cements have a density of 15.8 ppg.

TABLE 6.1

| Design | 1 | 36 | 37 | 38 |
|---|---|---|---|---|
| S2 (% bwoc) | 0.9 | 0.9 | 0.9 | 0.9 |
| Antifoam (gps) | 0.03 | 0.03 | 0.05 | 0.05 |
| NaCl (by weight of water) | 0 | 37 | 18.5 | 37 |
| Polynaphtalene (gps) | 0.04 | 0.9 | 0.9 | 1.5 |
| Mixing rheology | | | | |
| Ty (lbf/100 ft²) | Too viscous | 13.4 | 27.1 | 61.8 |
| PV (cP) | | 119 | 207 | 352 |
| BHCT rheology at 60° C. | | | | |
| Ty (lbf/100 ft²) | | 30.7 | 31.5 | 59 |
| PV (cP) | | 107 | 1059 | 433 |
| 10'/1'gel | | 28/19 | — | 433 |
| Free water mL | | Trace | | |

TABLE 6.2

| Design | 70 | 81 |
|---|---|---|
| Antifoam (gps) | 0.05 | 0.05 |
| Flac (gps) | 0.5 | — |
| Lignosulfonate (gps) | 0.05 | — |
| Polynaphtalene (gps) | — | 0.9 |
| Sulfonated melamine -formaldehyde (gps) | 0.12 | — |
| Sodium chloride (% BWOW) | — | 37 |
| Calcium chloride (% BWOC) | 2 | — |
| S2 (% BWOC) | 0.45 | 0.9 |
| Mixing rheology | | |
| Ty (lbf/100 ft²) | 29 | 30 |
| PV (cP) | 244 | 173 |
| BHCT tests at 60° C. Rheology | | |
| Ty (lbf/100 ft²) | 34 | 22 |
| PV (cP) | 211 | 110 |
| 10'gel/1'stiring | 17/9 | 23/10 |
| Free water (mL) | 0 | 0 |
| Fluid loss (mL API) | 78 | 18 |
| Thickening time | 5 h 17 min | — |

Example 7

This example shows that if the slurry density is lower, higher concentration of super-absorbent polymers can be used, even without the addition of a salt.

| Design | X7.1 | X7.2 | X7.3 |
|---|---|---|---|
| Density (lbm/gal) | 14 | 12 | 12 |
| BHCT (deg C.) | 60 | 25 | 85 |
| Antifoam (gps) | 0.03 | 0.02 | 0.02 |
| Flac (gps) | 0.4 | — | — |
| Lignosulfonate (gps) | 0.025 | — | — |
| Polynaphtalene (gps) | 0.045 | 0.03 | 0.03 |
| S2 (% bwoc) | 0.9 | 3 | 3 |
| S2 (% bwow) | 1.4 | 2.4 | 2.4 |

-continued

| Design | X7.1 | X7.2 | X7.3 |
|---|---|---|---|
| Mixing rheology | | | |
| Ty (lbf/100 ft$^2$) | 21.18 | 19.2 | 19.63 |
| PV (cP) | 156.9 | 90.3 | 86.39 |
| Rheology at BHCT | | | |
| Ty (lbf/100 ft$^2$) | 49.31 | 27.5 | 4.92 |
| PV (cP) | 180.5 | 169.7 | 82.78 |
| 10'gel/1'stiring | 32/22 | 28/12 | 11/6 |
| Fluid loss (mL API) | — | 149 | 240 |

Example 8

Cement samples comprising super-absorbent polymers were taken from the sedimentation column and additional water was added at the surface of broken pieces to simulate contact with formation water after a crack. Tests were performed at room temperature and at 60° C. In all cases, swelling was observed showing that the super-absorbent polymer particles remain effectively available to absorb additional water (even though the cement matrix always comprises residual water).

Example 9

This test was performed with super-absorbent S3. Good rheology is obtained.

TABLE 9

| Design | 5 | 13 | 19 |
|---|---|---|---|
| Density (lbm/gal) | 15.8 | 15.8 | 15.8 |
| BHCT (deg C.) | 60 | 60 | 60 |
| Antifoam (gps) | 0.05 | 0.03 | 0.05 |
| Flac (gps) | 0.5 | 0.4 | — |
| Lignosulfonate (gps) | 0.05 | 0.025 | — |
| Polynaphtalene (gps) | — | 0.05 | 0.9 |
| Sulfonated melamine formaldehyde (gps) | 0.12 | — | — |
| Sodium chloride (% BWOW) | — | — | 37 |
| Calcium chloride (% BWOC) | 2 | — | — |
| S3 (% bwoc) | 3 | 0.9 | 2 |
| S3 (% bwow) | 7.7 | 2.2 | 4.5 |
| Mixing rheology | | | |
| Ty (lbf/100 ft$^2$) | 26 | 19 | 4 |
| PV (cP) | 262 | 195 | 54 |
| BHCT Rheology | | | |
| Ty (lbf/100 ft$^2$) | 13 | 19 | 4 |
| PV (cP) | 154 | 145 | 30 |
| 10'gel/1'stiring | 7/5 | 14/4 | 15/6 |
| Free water (mL) | 0 | 0 | — |
| Fluid loss (mL API) | 48 | — | — |

We claim:

1. A method for maintaining zonal isolation in a subterranean well having a borehole comprising:
   (i) installing casing inside the borehole of a well, or inside a previously installed casing;
   (ii) pumping an aqueous hydraulic cement slurry comprising a polymethacrylate super-absorbent polymer having residual water-absorption properties after the setting of the cement, wherein the polymer is added at a concentration between 0.05% and 3.2% by weight of cement, and the polymer particle size is between 10 µm and 1500 µm;
   (iii) allowing the cement slurry to set and harden;
   (iv) in the event of cement-matrix or bonding failure, allowing the polymer to swell by being contacted by underground water, thereby restoring zonal isolation.

2. The method of claim 1, wherein the super-absorbent polymer is dry-blended with the cement.

3. The method of claim 1, wherein the cement slurry further comprises a salt.

4. The method of claim 1, whereby the polymer is provided in a capsule that releases the material in response to exposure of the cement to at least one downhole parameter.

5. The method of claim 1, whereby the polymer is provided in a capsule that releases the material when the cement matrix cracks.

6. The method of claim 1, wherein the cement slurry further comprises at least one additive selected from the group consisting of dispersing agents, fluid loss control agents, set retarders, set accelerators and anti-foaming agents.

7. A method for cementing a subterranean well having a borehole, comprising:
   (i) installing a casing inside the borehole of the well, or inside a previously installed casing;
   (ii) pumping an aqueous hydraulic cement slurry comprising a polymethacrylate super-absorbent polymer having residual water-absorption properties after the setting of the cement, wherein the polymer is added at a concentration between 0.05% and 3.2% by weight of cement, and the polymer particle size is between 10 µm and 1500 µm; and
   (iii) allowing the cement slurry to set and harden inside the annular region.

8. The method of claim 7, wherein the cementing process is primary cementing, and the cement slurry is either pumped down the interior of the tubular body and up through the annular region, or down the annular region and up the interior of the tubular body.

9. The method of claim 7, wherein the cementing process is remedial cementing, performed in either a cased or open hole.

10. The method of claim 7, wherein the cement comprises Portland cement.

11. The method of claim 7, wherein the cement slurry further comprises one or more members selected from the group consisting of dispersing agents, fluid-loss-control agents, set retarders, set accelerators and antifoaming agents.

12. A method of manufacturing a cement that will self-repair comprising dry blending a polymethacylate super absorbent polymer with a hydraulic cement, adding water in sufficient quantity so as to form a pumpable cement slurry, pumping the cement slurry in a wellbore, allowing the cement slurry to set, wherein in case of failure of the set cement, said set cement is repairing itself by allowing the super-absorbent polymer to swell when contacted by underground water, wherein the polymer is added at a concentration between 0.05% and 3.2% by weight of cement, and the polymer particle size is between 10 µm and 1500 µm.

13. The method of claim 12, wherein the super-absorbent polymer is provided in a capsule that releases the material in response to exposure of the cement to at least one downhole parameter.

14. The method of claim 12, wherein the viscosity of the pumpable cement slurry is below about 1000 MPa-s at a shear rate of 100 s$^{-1}$.

* * * * *